United States Patent Office 3,629,384
Patented Dec. 21, 1971

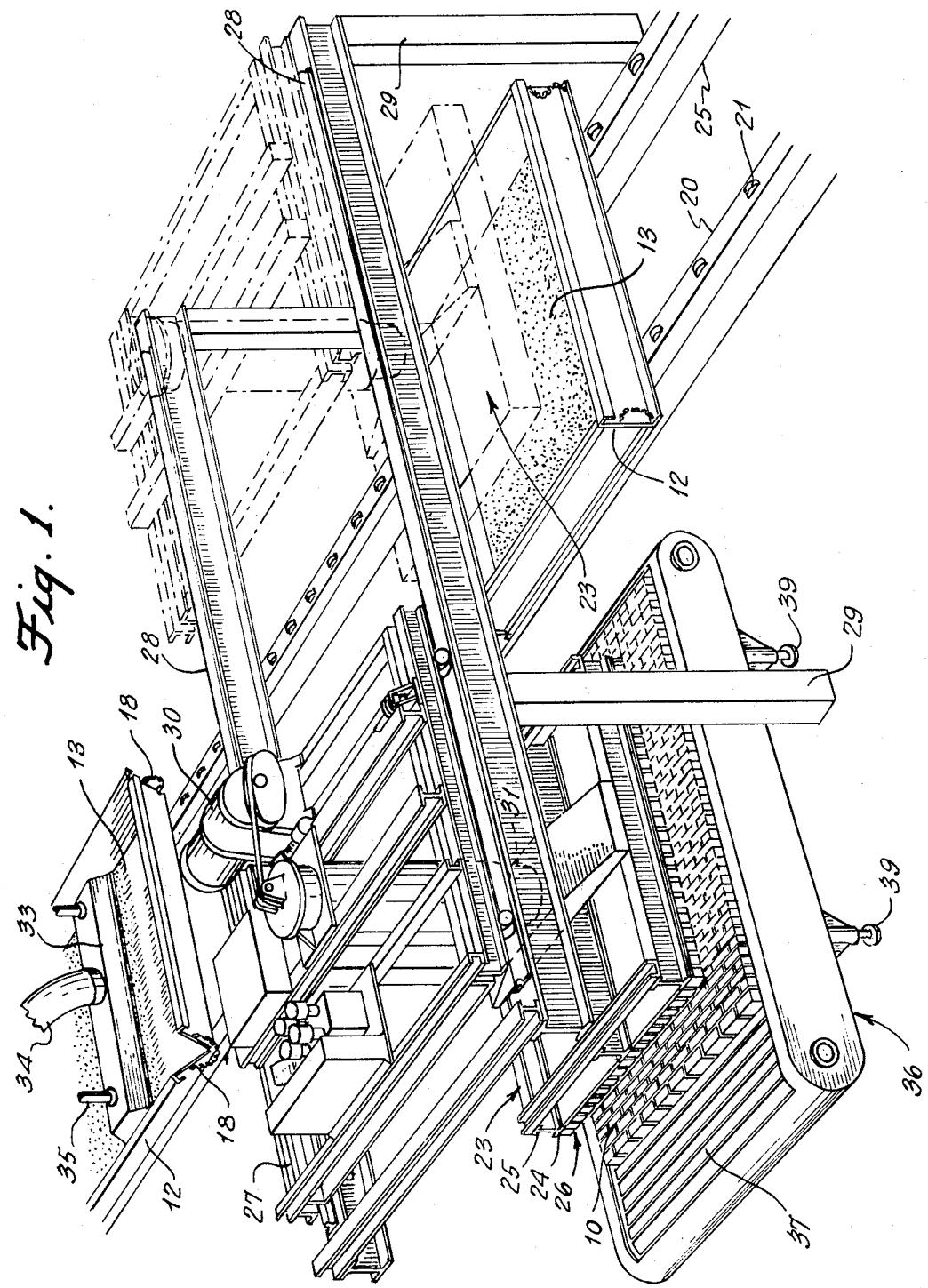

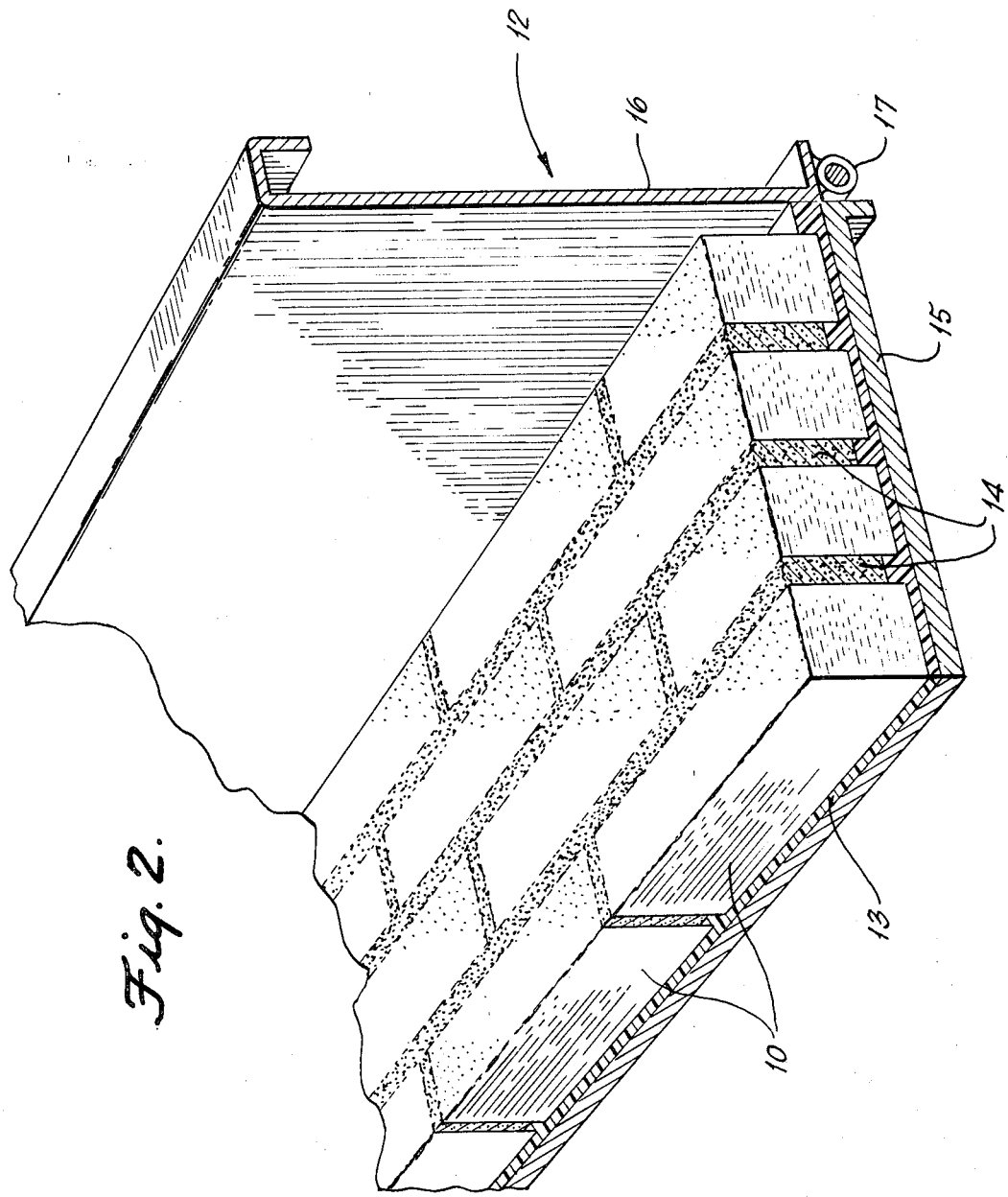

3,629,384
METHOD FOR FORMING COMPOSITE BUILDING ELEMENTS
Reinhold Magnus Elgenstierna, Stockholm, Sweden, assignor to Tegelindustriens Centralkontor Ab, Stockholm, Sweden
Continuation-in-part of abandoned application Ser. No. 609,758, Jan. 17, 1967. This application Sept. 4, 1969, Ser. No. 855,345
Int. Cl. B28b 23/00
U.S. Cl. 264—130
5 Claims

ABSTRACT OF THE DISCLOSURE

A method for the formation of building elements of the type having a plurality of bricks, tiles, or stones joined together by mortar. A mass of foamable plastics material is positioned in a mold and the bricks or stones are partially immersed therein, thus keeping them in position and preventing feathering of mortar on to the element face or other unsightly results in the forming process.

CROSS-REFERENCE TO RELATED APPLICATION

This application is a continuation-in-part of my copending application Ser. No. 609,758, filed Jan. 17, 1967, and now abandoned, and entitled "A Method in the Production of Building Elements with Surface Cover of Covering Panels, Building Stones or Other Covering Bodies."

BACKGROUND OF THE INVENTION

Field of the invention

This invention relates to a method for the production of composite structural elements by the partial immersion of facing members in a plastic mass in a mold, then joining the members together with cement or the like, and removing the formed element from the mold.

DESCRIPTION OF THE PRIOR ART

In recent years, especially because of the high cost of employing skilled construction workers, prefabrication of building modules has become increasingly important in the construction arts. A severe defect of prior art prefabricated masonry-like building modules has been their unattractive appearance since the methods for forming such elements have left bonding material on the module surfaces, or have resulted in otherwise marred surfaces. In the prior art, molds with their bottoms filled with various substances have been used, and various measures have been taken to position facing members, to facilitate removal of formed elements and to wash off or otherwise remove banding materials from face surfaces of the elements. These methods have not succeeded in producing prefabricated elements having strength and esthetic qualities equivalent to those of in-situ construction. The method and apparatus of the present invention overcome the above mentioned difficulties in a simple and economical manner.

SUMMARY OF THE INVENTION

According to the method of the present invention, a layer of foamable plastic material is formed in the bottom of a mold. A plurality of bricks, stones or other facing units are disposed in the plastic mass by partly immersing the units in their ultimate relationship as in the completed building element. The plastic mass may have been partially cured before the deposition of the units therein, and some pressure may be applied to position the units and to press them into the mass. Then bonding material is cast into the spaces defined between the units and allowed to harden. The plastic mass makes a close contact with the units faces so as to prevent feathering of the bonding material out on to the unit faces and at the same time produces smooth clean joints. Additional optional steps may be taken to prevent adhesion of the units to the plastic mass. The joined units are then removed as a completed building element, and no washing of the element's facing surface is necessary.

The apparatus for the method includes track means for advancing a mold from a station where foamable plastic material is deposited in the mass of plastic material. The facing units are brought to the mold arranged in their desired order, by a carrier equipped with suction means, from a continuous conveyor having a belt upon which the chosen arrangement of the facing units may be indicated.

It is accordingly an object of the invention to provide an economical method for producing composite building elements having a clean face and a technically excellent bond.

It is another object of the invention to provide a method for producing composite building elements by immersing facing units in a mass of plastic material for retaining the units in position while settable bonding material is poured between the units.

BRIEF DESCRIPTION OF THE DRAWINGS

Other objects and advantages of the invention will become obvious from the accompanying drawings together with the following detailed description. In the drawings:

FIG. 1 is a view in prespective of an apparatus for use in the invention with shadow lines showing an advanced position of the carriage.

FIG. 2 is a showing in perspective, with parts cut away, of the interior of a mold with facing units positioned according to the invention.

DESCRIPTION OF A PREFERRED EMBODIMENT

Reference is made to FIG. 1 for an overall picture of the apparatus. In the drawings facing units are shown in the form of bricks 10, although the method and apparatus are suited for use in connection with other types of facing units such as tiles or building stones of different shapes. A generally rectangular mold 12 receives a layer 13 of settable plastic material, preferably of the foamable type such as polystyrene, polyurethane, polyisocyanate foam or the like. The plastic material 13 is spread onto a flat bottom sheet 15 of the mold. The mold 12 itself is best shown in FIG. 2.

As shown in FIGS. 1 and 2 mold 12 has flat bottom 15 and upright side walls 16, which terminate at their upper portions in returned ends 18. The side walls 16 are connected to the mold bottom 15 by hinges 17, which permit the walls 16 to be lowered outwardly for easier filling of the mold with foam material 13 in a manner to be described. At the corners of mold 12 the adjacent side walls are connected by restraining means, shown in FIG. 1 as chain-like members 18. These members 18 permit the securing of the side walls 16 in their upright positions. At the upper left in FIG. 1 a mold 12 is shown with its side walls 16 hinged outwardly, and in the lower right foreground of FIG. 1 a mold 12 is shown with its sides 16 locked upright.

The molds 12 of FIG. 1 are supported by a pair of parallel tracks 20 having spaced wheel-like bearings 21 for advancing the molds from the left to the right of FIG. 1. A mold 12 is first partially filled with a layer of plastic material 13, its side walls 16 are locked upright, and then the mold 12 is slidably moved down the tracks 20 to the advanced position of FIG. 1 where it is ready to receive the facing units 10.

The facing units could be positioned by hand into the plastic mass 13 formed in the mold 12, but preferably they are positioned therein by automatic apparatus shown in FIG. 1. A conveyor generally indicated by reference numeral 36 has a continuous endless belt 37, the outer surface of which is provided with indicia showing a pattern in which the facing units are to be arranged. In the embodiment illustrated the indicia are parallel score lines upon which the bricks 10 are arranged in a break-joint fashion. The conveyor 36 is motor actuated for forward motion to permit an operator to place bricks on the belt 37 thereof in successive rows.

Above the conveyor 36 and extending to a location above the advanced position of a prepared mold 12 as shown in FIG. 1, there extend two parallel horizontal rails 28, supported by upright posts 29. A displacement mechanism 23, to be described, runs along the rails 28 to carry bricks 10 from the conveyor 36 to the prepared mold 12.

The displacement mechanism 23 preferably comprises a flattened rigid rectangular plate 24 with a reinforcing frame of I-beams 24 or the like. Suction cup means 26, operable to attach themselves to each of the facing units 10, are arranged on the underside of plate 24. These suction cup means 26 are also operable to release the units 10 when they have been deposited in a mold 12.

An hydraulic lifting and lowering mechanism, somewhat similar to that of a press, is generally indicated by reference numeral 31. As shown in the solid lines of FIG. 1 the plate 24 with its suction members 26 is lowered on to the facing units 10 when the desired arrangement of units 10 has been set up on the belt 37 to conveyor 36. The suction cup members 26 attach themselves to the facing units 10 and the hydraulic mechanism 31 lifts the plate 24 with the array of facing units 10 from the conveyor. Then a carriage 27, driven by a driving mechanism 30, advances the plate 24 in its elevated position shown in shadow lines in FIG. 1, above the prepared mold 12.

At this point the carriage 27 stops its forward movement and the hydraulic mechanism 31 lowers the plate 24 with the attached facing units 10. The facing units 10 are immersed to the desired depth in the foam material 13. The depth to which the units 10 are immersed may depend on how deeply it is desired that bonding material should penetrate into the spaces or open joints between adjacent units 10.

Reverting to FIG. 2, it can be seen that bonding material 14 fills the spaces between the bricks 10 to a depth determined by how deep the bricks 10 have been immersed in the foam plastic mass 13. The plate 24 is kept parallel to the base 15 of the mold 12 so that all of the bricks 10 are immersed to the same depth.

In some cases the plastic material may be allowed to set or harden to some degree before the facing units are immersed therein, though not allowed to set completely. This will be the case when a plastic material which sets slowly is used. If the plastic material 13 is resistant to the immersion of facing units 10 therein, a pressure sufficient to immerse the units 10 to the desired depth may be applied through plate 24 by the hydraulic mechanism 31.

Also shown in FIG. 1 is a preferred device for supplying foamable material to the mold 12 and smoothing the material into a level layer 13. This device comprises an elongated, trough-like applicator 33 fed with foamable material through a flexible tubular supply hose 34. The applicator has slanted front and back walls for smoothing out the layer 13 of foamable material and is shown to be supported by tubular rods 35 which permit the lifting and lowering of the applicator. The length of the applicator is slightly less than the width of a mold 12 and it fits within the mold easily when the mold sides 16 are lowered outwardly as described above.

The apparatus may be made further adjustable for use with facing units of different dimensions by providing the conveyor 36 with supporting feet 39 of adjustable height. Such adjustable supports also make the levelling of the conveyor 36 a simple operation.

METHOD OF THE INVENTION

Essential to the method of the invention is the placement of facing units 10 individually into a mold 12 in the desired pattern or arranged in their final bond design, with open joints between units, before the mortar or grout 14 is added. The units 10 are applied into a soft, plastic mass 13 of a synthetic resinous composition, partially or completely covering the bottom 15 of the mold 12, the mass 13 having been caused to set or harden to at least some extent prior to the placement of the facing units therein. Thus, in a preferred embodiment where a thermosetting resinous material in the form of a liquid, semiliquid, or paste is used, the material is made to set or cure before or after its introduction into the mold by means of a hardener or other chemicals added to the thermosetting material. The setting time and hardness of the plastic mass may be adjusted in a known manner by the addition of special chemical admixtures and by control of temperature.

For some compositions used as the plastic layer 13 the mold bottom may be made hollow so that it can be filled with a suitable coolant solution, or the facing units 10 themselves may help to cool the sealing body 13 of plastic material by absorbing heat therefrom upon immersion.

The sealing body 13 of plastic material should have such surface characteristics that the facing units 10 will be readily released. This release can be aided by the wetting of the facing units 10 prior to immersion into the plastic mass 13, or by the treatment of the facing units 10 with a chemical releasing agent.

With the apparatus shown in FIG. 1 the plastic material may advantageously be of the foamable type, which has been caused to set, at least partly, before it is introduced into the mold 12 through applicator 33 and hose 34. The units may prior to their arrangement on said conveyor 36 be treated with water or another releasing agent.

After the units 10 have been immersed to the preselected depth in the plastic material 13, grout or other bonding material 14 is poured or otherwise placed in the joint spaces between adjacent units. Whether in a thin or thick layer, the material 13 will seal the grooves or joints between the units 10 immediately and effectively, thereby preventing the exterior surface from being fouled by grout or the like feathering out on to the faces of the units 10 during the bonding process. By pressure on the units 10 during immersion the plastic mass 13 may, if desired, be forced to penetrate a small distance into the joints thereby forming a convex or concave surface or meniscus, so that the bonding material 14 will not reach all the way to the surface and an attractive relieved joint will result.

This process allows sealing of the surface of the building element immersed in the material 13 just as simply and effectively whether the bond is arranged in a regular pattern or whether it forms an arbitrary, irregular design. The method is unaffected by dimensional variations in sizes of units 10, and is not adversely affected by the presence of warping, bulging or broken-off chips. The profiling of the joints in recess is simple and any depth of recess may be arbitrarily chosen by selecting the depth of immersion of the units 10. No special arrangements are needed to keep facing units 10 in their correct position in the array, the weight of the units 10 sufficing for this purpose. Thus latter stages of the manufacturing process are unimpeded.

The mortar, grout or other bonding material is permitted to set in the usual way. The joined element is lifted from the molds 12 a hydraulic means similar to means 31 or by some other means upon completion, and the mass of plastic material 13 is torn loose from the element face, which is so attractive in appearance that no further cleaning is required.

The plastic material 13 may of course then be processed for re-use, as by melting it down, chemical treatment, or other treatment suitable to the particular material used.

Foamable plastics materials have been found especially suitable for use in the sealing layer 13. In some cases, however, such materials show disadvantages. If it is desired to remove the surface skin of the mortar joints 14 to expose the mortar by means of a retarding agent, the retarding agent may ordinarily be sprayed on to the foam plastic in the mold 12. In certain cases a cracking of the retarding agent results in an irregular and less attractive exposure of the filler material.

Also, certain kinds of foam plastics may contain chemical compounds which react with unsoluble compounds, such as lime, contained in the facing units 10. Even if the absorbing capacity of the facing units 10 be reduced by wetting the units before immersing them into the mold, the facing units may, for example, absorb phosphoric acid from the foam plastics. Tricalcium phosphate may be a reaction product of such absorption, and this is difficult to remove, necessitating mechanical finishing steps.

In accordance with one embodiment of the invention these disadvantages are eliminated in a simple and economical manner by applying a covering to the surface of sealing body 13 while it is in the mold 12. The covering (not shown) may be a resilient sealing layer in the form of a membrane or pellicle applied directly to the surface of layer 13 as a ready-made thin foil. If it is desired merely to interrupt any possible capillary penetration between the layer 13 and the facing units 10, the separating or protective coating need not form a perfect seal, but just cut off capillary action. For this purpose a thin layer of pulverulent material, such as sand or some other powder, or a thin foil, as discussed above, may be utilized. One essential feature of the protective layer, of whatever material, is that it must be sufficiently flexible as to fit into the boundary surfaces of the facing units 10. A resilient sheet, or a powdered material is particularly suited for this purpose.

It will be obvious to those skilled in the art that numerous modifications and changes may be made in the apparatus and method set forth without departing from the spirit and concept of the invention disclosed.

What is claimed is:

1. A method of manufacturing composite structural elements of the type having a plurality of facing units joined together by mortar, comprising: selecting plurality of facing units and arranging said units in a predetermined, spaced pattern with open spaces between adjacent units, so that the units are in the same relative positions that the units will have in a finished structural element; applying a mass of foamable, settable plastics material to the bottom of a mold as a layer; causing said layer of plastics material to cure partially; transferring the arranged plurality of facing units to said mold while maintaining the units in said pattern; partially immersing all of said arranged plurality of facing units to a preselected depth in the partially cured plastics material in the mold; casting mortar in the spaces defined by the plastics material and between adjacent facing units and permitting the mortar to set for joining the units together to form a composite element, said plastics material preventing the mortar from soiling the immersed portions of the units; then removing the composite element from the mold and tearing the plastics material loose from the element to expose the face of the composite element.

2. The method of claim 1, including the step of applying a thin sealing surface layer to the plastics material in the mold before said partial immersion of the facing units for preventing any contamination of the faces of the facing units by said plastics material.

3. The method of claim 1 including wetting the facing units prior to said immersion to prevent the units sticking to the plastic mass.

4. The method of claim 1 including applying mechanical pressure to press said units into said plastic mass.

5. The method of claim 2 wherein said surface layer is sprayed on to the plastic mass.

References Cited

UNITED STATES PATENTS

| | | | |
|---|---|---|---|
| 3,359,354 | 12/1967 | Johnson | 264—261 |
| 1,082,231 | 12/1913 | Nale | 264—256 |
| 2,895,653 | 10/1958 | Kastenbein | 264—261 |

ROBERT F. WHITE, Primary Examiner

G. AUVILLE, Assistant Examiner

U.S. Cl. X.R.

264—45, 166, 261, 264, DIG 44